(12) United States Patent
Missoni

(10) Patent No.: US 7,756,223 B2
(45) Date of Patent: Jul. 13, 2010

(54) CONTACTLESS DATA CARRIER WITH CURRENT DEMODULATION

(75) Inventor: Albert Missoni, Graz (AT)

(73) Assignee: Infineon Technologies AG, Neubiberg (DE)

( * ) Notice: Subject to any disclaimer, the term of this patent is extended or adjusted under 35 U.S.C. 154(b) by 1225 days.

(21) Appl. No.: 11/088,228

(22) Filed: Mar. 23, 2005

(65) Prior Publication Data

US 2005/0213688 A1 Sep. 29, 2005

(30) Foreign Application Priority Data

Mar. 23, 2004 (DE) .................. 10 2004 014 203

(51) Int. Cl.
*H04L 27/06* (2006.01)
(52) U.S. Cl. ...................... 375/340; 375/316
(58) Field of Classification Search ................ 375/316, 375/340; 340/10.34, 10.1, 572.1, 572.8, 340/10.4; 235/492, 494, 451; 329/349, 366, 329/370; 713/320
See application file for complete search history.

(56) References Cited

U.S. PATENT DOCUMENTS

| | | | | |
|---|---|---|---|---|
| 5,495,241 A | * | 2/1996 | Donig et al. ........... 340/870.39 |
| 5,652,768 A | * | 7/1997 | Ritter et al. .................. 375/320 |
| 5,801,372 A | * | 9/1998 | Yamaguchi .................. 235/492 |
| 6,134,130 A | * | 10/2000 | Connell et al. ................. 363/89 |
| 6,173,899 B1 | * | 1/2001 | Rozin ......................... 235/492 |
| 6,323,728 B1 | | 11/2001 | Schmitt-Landsiedel et al. |
| 6,659,352 B1 | * | 12/2003 | Asada et al. ................. 235/492 |
| 6,737,884 B2 | * | 5/2004 | Shigemasa et al. ............ 326/38 |
| 6,996,726 B1 | * | 2/2006 | Den Besten et al. ......... 713/300 |
| 7,097,109 B2 | * | 8/2006 | Berger ........................ 235/492 |
| 2001/0035461 A1 | * | 11/2001 | Sedlak et al. ............... 235/492 |

FOREIGN PATENT DOCUMENTS

| | | |
|---|---|---|
| DE | 196 34 134 C1 | 4/1998 |
| EP | 0 940 769 B1 | 9/1999 |
| EP | 1103915 | 5/2001 |
| FR | 2751148 | 1/1998 |
| JP | 05-135226 | 6/1993 |
| JP | 2002506259 | 2/2002 |
| JP | 2002142356 | 5/2002 |

* cited by examiner

*Primary Examiner*—Shuwang Liu
*Assistant Examiner*—Helene Tayong
(74) *Attorney, Agent, or Firm*—Dickstein, Shapiro, LLP.

(57) ABSTRACT

A data carrier including demodulating circuitry for detecting a data signal carried by a received electromagnetic wave. The demodulator produces a signal derived from at least two additional signals. The first of the additional signals is dependent upon current received from the input to the data carrier and the second of the additional signals is dependent on current fluctuation relating to dynamic current loads.

19 Claims, 3 Drawing Sheets

CONTACTLESS DATA CARRIER WITH CURRENT DEMODULATION

CROSS-REFERENCE TO RELATED APPLICATION

This application claims priority to German Patent Application Serial No. 102004014203.3 filed Mar. 23, 2004, and which is incorporated herein by reference in its entirety.

FIELD OF INVENTION

The invention relates to a data carrier designed to reliably demodulate a data carrying electromagnetic signal through the use of signal combining circuitry.

BACKGROUND OF THE INVENTION

Data carriers are known in the form of smart cards, as emerges for example from DE 19634134 A1. In the case of the method described therein for transmitting data between a terminal and a portable data carrier via a wire-free electromagnetic transmission link, a 100% ASK modulation of the carrier signal takes place. This switching on/off of the carrier signal is comparatively straightforward to demodulate on a data carrier, but has the disadvantage that no clock signal is available during the blanking interval.

Besides the 100% ASK modulation, a 10% ASK modulation is also employed. In the case of this type of modulation, the carrier signal is not switched on and off, rather the amplitude of the carrier signal is merely reduced by 10%. Such a modulation is comparatively difficult to demodulate since, in the case of a change in the distance between a read/write device and the data carrier, the field strength that is effective there fluctuates greatly.

An improved data carrier is disclosed in EP 0940769 B1. The data carrier proposed therein is provided with a parallel regulator that keeps the voltage across the coupling element or at the output of the rectifier constant by controlling the current flowing through the parallel regulator. A current measuring device is provided between the rectifier and the parallel regulator and provides an input signal for an amplitude demodulator.

What is problematic about the known circuits is that data carriers have circuit components having a greatly fluctuating current consumption. There is the risk, therefore, that a detected current fluctuation will be interpreted as a field strength change in accordance with a 10% ASK modulation even though what is involved is a sudden change in load in one of the circuit components provided on the data carrier.

In order to avoid such errors, the circuit components of the data carrier can be operated in such a way that they do not generate any load changes. However, this is very complicated in the circuit design. U.S. Pat. No. 6,134,130 discloses providing a constant current sink which compensates for the irregular current demand of the chip. A uniform current demand then appears outwardly. What is unfavorable, however, is that the average current consumption rises, which also leads to an additional heating of the data carrier.

SUMMARY OF THE INVENTION

It is an object of the invention to specify a data carrier which has a lower sensitivity to current consumption fluctuations and which is simple in its construction.

This object is achieved according to the invention by means of a data carrier of the type mentioned in the introduction having a second measuring device for providing a second signal dependent on the current consumption of dynamic current loads, and having a combination device for forming a third signal for feeding to the demodulator from the first and second signals in such a way that the dependencies on the current consumption of dynamic current loads are at least partly compensated for in the third signal.

Further advantageous refinements of the invention are specified in the Detailed Description of Exemplary Embodiments of the Invention below and in the claims.

DETAILED DESCRIPTION OF EXEMPLARY EMBODIMENTS OF THE INVENTION

A below-described embodiment of the present invention includes a data carriers with a coupling element for receiving an amplitude-modulated signal and for taking up energy from an electric field, a rectifier circuit connected downstream of the coupling element, a parallel regulator connected to the rectifier circuit, a first measuring device for providing a first signal dependent on the current through the coupling element, and a demodulator for demodulating the first signal.

On the one hand the overall current consumption of the data carrier is detected and, in addition, the current consumption of dynamic current loads is detected. The overall current consumption is dependent on a current through the parallel regulator, a current through constant current loads and a current through dynamic current loads. The current through the parallel regulator thus contains two dynamic variables, firstly the amplitude-modulated signal and secondly current changes as a result of sudden load changes of the dynamic current loads.

An advantage of the circuit according to the invention is that, as a result of detecting the current consumption of dynamic current loads, by means of a suitable combination with the signal dependent on the overall current consumption, it is possible for the current fluctuations caused by sudden load changes to be at least partly compensated for. The third signal at the output of the combination device provided for this purpose therefore no longer depends at all, or depends only to a small extent, on the sudden load changes of dynamic current loads. The sole dynamic signal change depends on the amplitude-modulated signal which is to be demodulated and which is fed to the ASK-suitable demodulator for this purpose. The third signal may also contain components which stem from the current consumption of constant loads and are therefore themselves constant. These do not disturb the demodulation and are therefore unproblematic.

In an advantageous embodiment, the first signal, which is dependent on the overall current consumption, is derived from a drive signal of a regulating transistor of the parallel regulator.

Furthermore, it is advantageous to provide a series regulator between the rectifier circuit and the dynamic current loads for the purpose of regulating the supply voltage for the dynamic current loads. The second signal, which is dependent on the current consumption of dynamic current loads, can then advantageously be obtained from a drive signal for a regulating transistor of the series regulator.

In a development of the invention, the current consumption of different dynamic current loads can be detected separately and is fed to the combination device independently of one another.

Figure 1:
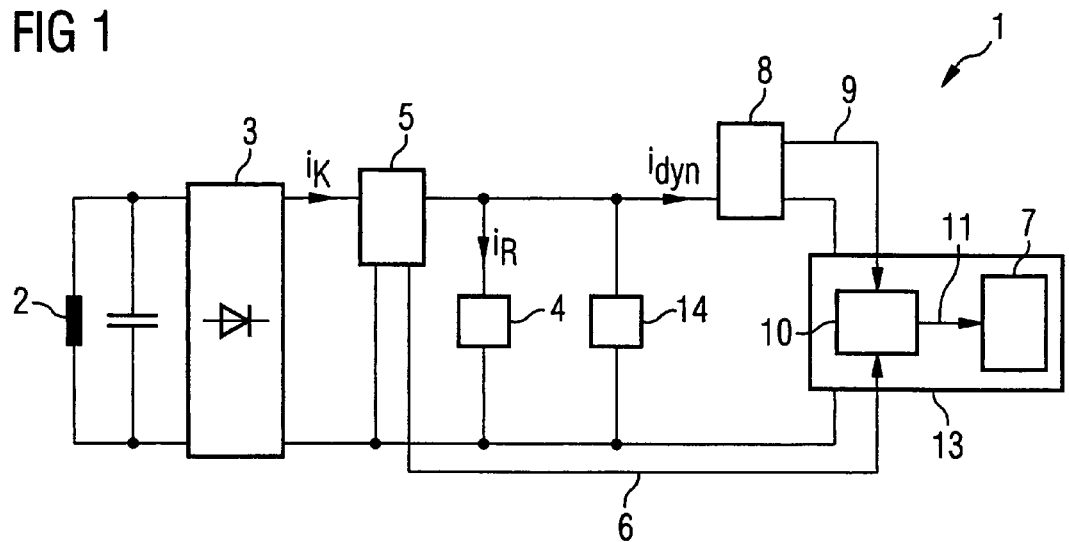
FIG. 1 shows a schematic illustration of the construction of a data carrier according to the invention.

FIG. 1 shows a data carrier 1 according to the invention with a resonant circuit comprising a coil 2, which is used as a coupling element, and a capacitor. The coupling element 2 is connected to a rectifier circuit 3. The data carrier furthermore has constant current loads 14 and dynamic current loads 13, which are supplied with a voltage which can be tapped off at the output of the rectifier circuit 3. A parallel regulator 4 is provided for the purpose of regulating the voltage made available to the loads, and a current of greater or lesser magnitude flows through said parallel regulator depending on the voltage present at the rectifier output, which current loads the coupling element and thereby regulates the voltage.

The coupling element 2 is provided firstly for taking up energy from an electric field generated by a read/write device, and secondly for receiving an amplitude-modulated signal that is likewise generated by the read/write device or else by another data carrier. A 10% ASK modulation is used for the modulation, i.e. the carrier signal changes its amplitude by 10%, depending on the data to be transmitted. In the data carrier 1, the change in field strength that results from the modulation then has to be detected and fed to a detector 7.

Since the data carrier according to the invention is equipped with a parallel regulator 4, the voltage across the coupling element 2 is essentially constant and cannot be used for a detection of changes in field strength. However, the current $i_R$ is dependent on the modulation since, in order to obtain a constant voltage, the current has to be changed in accordance with the modulation. By detecting the current $i_K$ through the coupling element 2, it is possible, therefore, to obtain a signal which is dependent on the amplitude-modulated field strength of the electric field. For this purpose, a first measuring device 5 is provided between the rectifier circuit 3 and the parallel regulator 4 and generates a first signal 6 dependent on the current $i_K$ through the coupling element 2. The first signal 6 is fed to a combination device 10.

As discussed in the introduction, the first signal obtained contains not only changes caused by a modulation of the electric field, but also an item of "information" generated from sudden load changes of dynamic current loads 13. Depending on the type of sudden load changes, it is not possible for the demodulator 7 to distinguish the current fluctuations caused by said sudden load changes from amplitude modulations. Therefore, a second measuring device 8 is provided, which generates a second signal 9 dependent on the current consumption of the dynamic current loads 13. The second signal 9 is likewise fed to the combination device 10. By means of a suitable combination of the first signal 6 and the second signal 9, a third signal 11 can be generated in which the dependencies on the current consumption $I_{dyn}$ are at least partly compensated for. The combination may be effected for example in such a way that the first signal 6 and the second signal 9 are added, in which case, when generating the signals 6 and 9, it must be taken into consideration that alterations in the respectively measured current have a converse effect. The signals could correspondingly be subtracted if changes in the respectively measured currents change in the same sense. The third signal 11 is then fed to the demodulator 7, which is then able to reliably demodulate a 10%-ASK-modulated signal even in the case of weak field strengths.

In the case of a weak field strength, the dynamic current consumption forms an ever more dominant proportion of the overall current consumption. Therefore, it is important, particularly in the case of a weak field strength, that the influences of the dynamic current loads are compensated for in the signal to be demodulated. The invention's configuration of a data carrier enables the latter to be reliably operated even in the case of weak field strengths, which increases the range of the data carrier.

Figure 2:
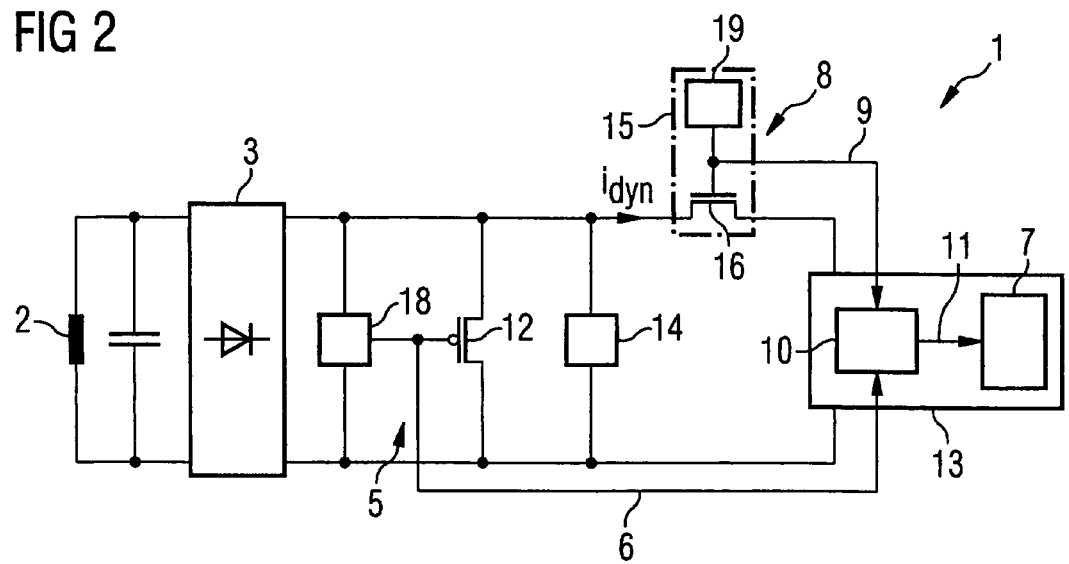
FIG. 2 shows a more detailed illustration of the exemplary embodiment from FIG. 1.

A more detailed illustration of a data carrier according to the invention is illustrated in FIG. 2. The parallel regulator 4 has a regulating transistor 12 and a control component 18, which drives the gate of the transistor 12. The transistor 12 is a PMOS transistor since the latter is particularly well suited to current control. The current flowing through the regulating transistor 12 is proportional to the voltage at its gate terminal. Therefore, the first measuring device 5 is provided in a particularly simple manner by tapping off the drive voltage for the transistor 12 and feeding it as first signal 6 to the combination device 10. The second measuring device for measuring the current consumption of dynamic loads is combined with a series regulator 15 in the exemplary embodiment described in FIG. 2. The series regulator 15 has an NMOS regulating transistor 16 and a control component 19, which generates a drive voltage for the gate terminal of the transistor 16. The second signal 9 is generated by making use of the fact that the voltage across the dynamic current loads is greatly dependent on the present current consumption of the dynamic current loads 13. On the other hand, the gate voltage of the transistor 16 is separated by a fixed interval from the source voltage. Consequently, the voltage at the gate of the transistor 16 is a measure of the current through the dynamic current loads 13. A second measuring device 8 is provided by a tapping of the drive voltage of the control components 19 at the gate of the transistor 16. The second signal 9 is then fed to the combination device 10. The further processing of the first and of the second signal 6 and 9 is effected as in the case of FIG. 1.

Figure 3:
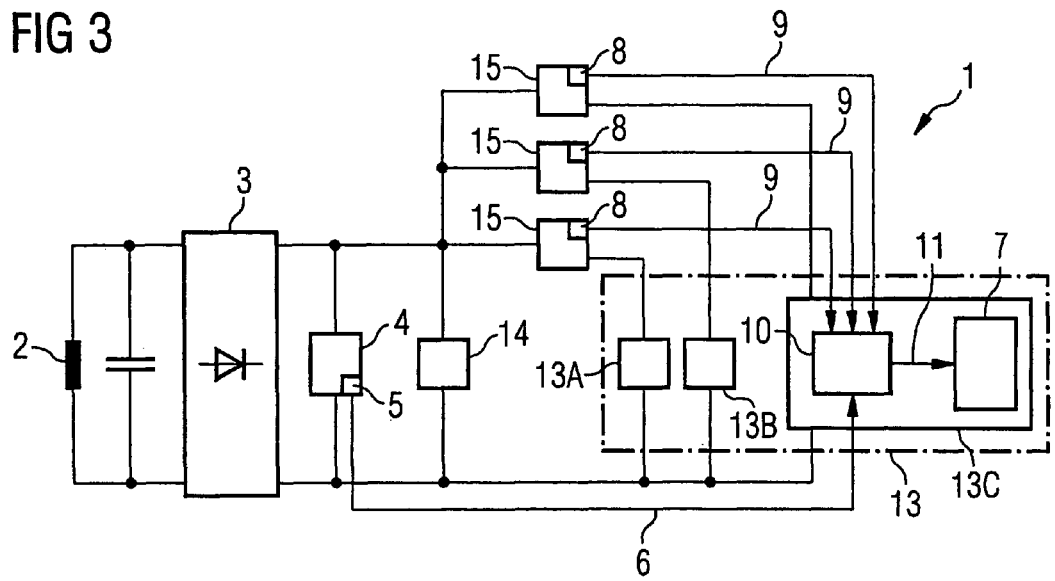
FIG. 3 shows an extended exemplary embodiment of a data carrier according to the invention.

FIG. 3 shows a further exemplary embodiment. Different dynamic current loads 13a, 13b and 13c are supplied separately in the case of this exemplary embodiment. One reason for this might be safety aspects, but different supply voltages might also be required for different current loads. A series regulator 15 is provided for each of the dynamic current loads 13a, 13b and 13c, and in each case has a second measuring device for the purpose of generating a second signal that is fed to the combination device 10. The combination device 10 adds the measured values of the second signals 9 and combines them with the first signals 6.

Figure 4:
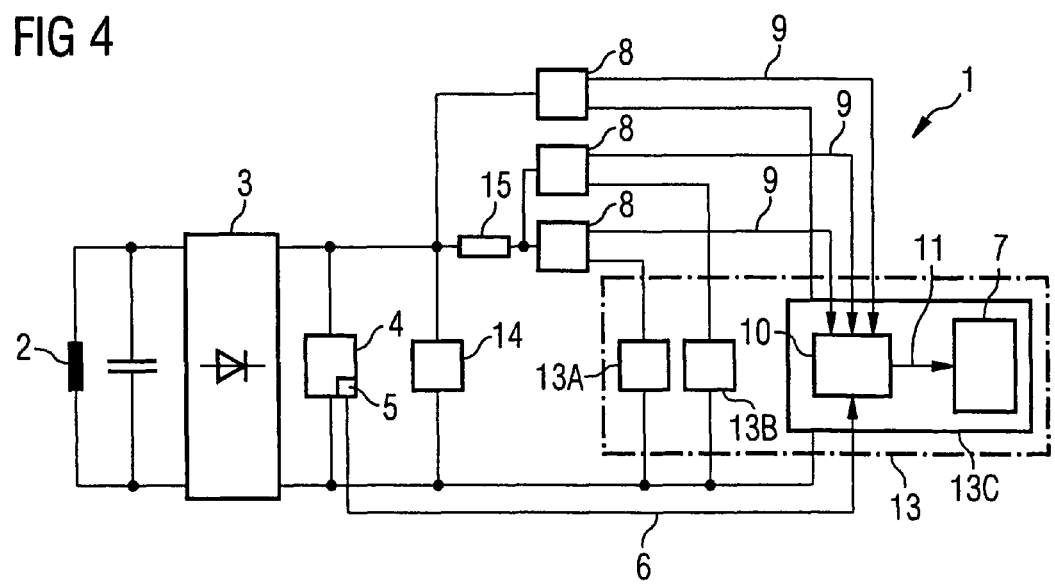
FIG. 4 shows an exemplary embodiment of a data carrier according to the invention that is configured as an alternative to FIG. 3.

The exemplary embodiment of FIG. 4 is a modification of the exemplary embodiment of FIG. 3. In this case, only one series voltage regulator 15 is provided, but a separate second measuring device 8 in each case is nevertheless provided for different dynamic current loads 13a, 13b and 13c. In this case, the series voltage regulator 15 regulates the supply voltage for the dynamic current loads 13a and 13b, while the dynamic current load 13c acquires a voltage tapped off upstream of the series voltage regulator 15. This exemplary embodiment takes account of the fact that the voltage is regulated by the parallel regulator 4 for example to a so-called medium voltage of 5V. By contrast, the current loads 13a and 13b, which are fed their supply voltage via the series voltage regulator 15, operate with a so-called low voltage of typically 2V. This makes it necessary to detect the present current consumption separately for the different loads.

Figure 5:
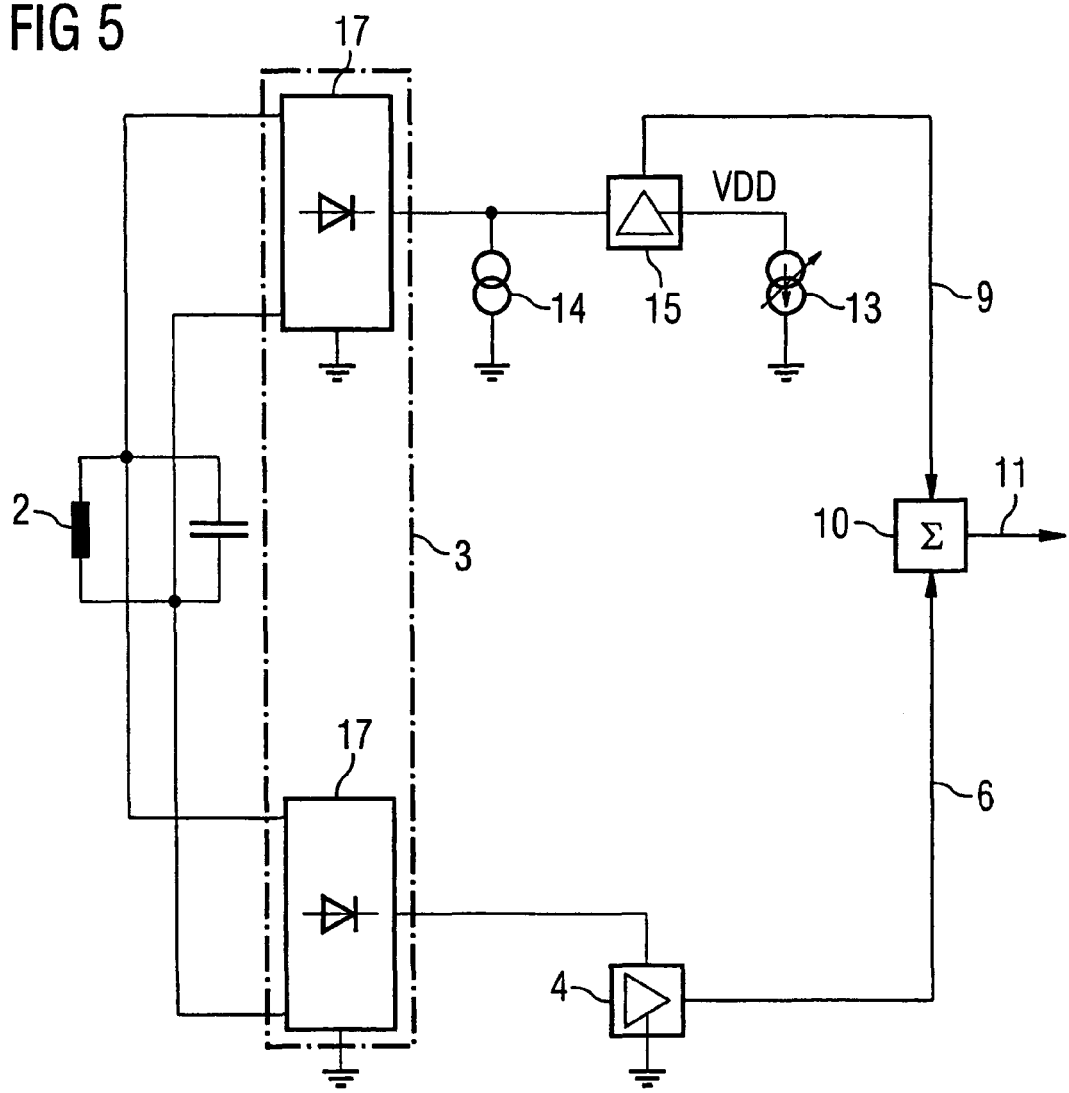
FIG. 5 shows a schematic illustration of a data carrier according to the invention with two rectifiers.

FIG. 5 illustrates a development of the exemplary embodiment of FIG. 1. In this case, the rectifier circuit 3 has two rectifiers 17 connected in parallel. While one of the rectifiers 17 provides at its output a voltage that is fed to the loads 14 and 13, the other rectifier 17 is connected to the parallel regulator 4, which regulates the magnitude of the voltage provided. Since the rectifiers 17 are connected in parallel, an increase in the current through the parallel regulator 4 and the lower one of the rectifiers 17 illustrated also brings about a reduction of the voltage at the output of the upper rectifier 17.

Figure 6:
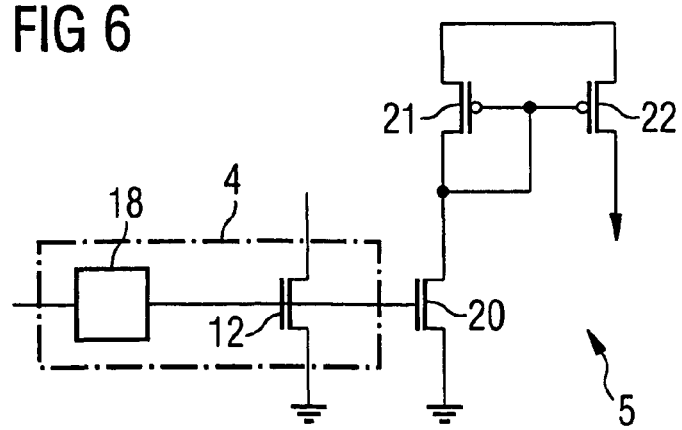
FIG. 6 shows a detailed illustration of a parallel regulator and a measuring device connected thereto for detecting the current consumption.

FIG. 6 shows a detailed embodiment of the parallel regulator 4 from FIG. 5. The regulating transistor 12 is driven by a control component 18. The control component 18 and the regulating transistor 12 form the parallel regulator 4. The drive voltage for the gate of the transistor 12 is simultaneously passed to the gate terminal of a transistor 20. The latter is connected to a transistor 21, which is connected as a diode and is in turn connected by its gate terminal to the gate terminal of a further transistor 22. In addition, the source and drain terminals of the two transistors 21 and 22 are connected to one another. The first signal 6 can be tapped off at the transistor 22. The arrangement of the transistors 21 and 22 together with the connection to the gate terminal of the transistor 12 forms the first measuring device 5.

What is claimed is:

1. A data carrier comprising:
   a coupling element configured to receive an amplitude-modulated signal and to receive energy from an electric field;
   a rectifier circuit connected downstream of the coupling element;
   a parallel regulator connected to the rectifier circuit;
   a first measuring device configured to provide a first signal dependent on current consumption of the coupling element;
   a second measuring device configured to provide a second signal dependent on current consumption of dynamic current loads;
   a combination device configured to combine the first and second signals to form a third signal; and
   a demodulator configured to demodulate the third signal, wherein dependencies on the current consumption of dynamic current loads are at least partly compensated for by the third signal.

2. The data carrier as claimed in claim 1, wherein the first signal is derived from a drive signal of a regulating transistor of the parallel regulator.

3. The data carrier as claimed in claim 1, wherein a series regulator is connected between the rectifier circuit and the dynamic current loads, and wherein the series regulator is configured to regulate a supply voltage for the dynamic current loads.

4. The data carrier as claimed in claim 3, wherein the second signal is derived from a drive signal of a regulating transistor of the series regulator.

5. The data carrier as claimed in claim 1, wherein one or more second signals dependent on the current consumption are provided for different dynamic current loads and are fed to the combination device for the purpose of forming the third signal.

6. The data carrier as claimed in claim 1, wherein the rectifier circuit comprises first and second parallel rectifiers, and wherein an output of the first rectifier is connected to the parallel regulator, and an output of the second rectifier is connected to at least the dynamic current loads.

7. A method for demodulating an electromagnetic signal in a data carrier, the method comprising:
   receiving the electromagnetic signal by a coupling element;
   inducing a voltage created by the electromagnetic signal at a rectifier circuit;
   generating a first current signal by a first measuring device at an output of the rectifier circuit;
   generating a second current signal by a second measuring device, a value of the second current signal being dependent on the current consumption of one or more dynamic current loads;
   generating a third current signal by a combination device, the third current signal being dependent upon a combination of the first and second signals; and
   demodulating the third current signal by a demodulator, wherein the demodulating step produces data carried by the electromagnetic signal.

8. The method of claim 7, wherein the first and second current signals are delivered to the one or more dynamic current loads.

9. The method of claim 7, wherein generating the third current signal step includes either the step of adding the first and second current signals, or the step of subtracting the first and second current signals.

10. A method for demodulating an electromagnetic signal in a circuit to obtain information, the method comprising:
    generating first and second signals, by first and second measuring devices, respectively indicative of first and second currents, wherein the first current is overall current consumption of the circuit and carries the information, and the second current is current consumption of one or more dynamic current loads of the circuit;
    generating a third signal, by a combination device combining the first and second signals;
    providing the third signal to a demodulator; and
    demodulating the third signal, by the demodulator, to recover the information, wherein dependencies on the current consumption of dynamic current loads are at least partly compensated for by the third signal.

11. The method of claim 10, wherein the circuit includes an antenna that receives electromagnetic energy, at least part of which represents the information.

12. The method of claim 11, wherein each of the first and second signals includes two or more composite signals.

13. A circuit for obtaining information, the circuit comprising:
    means for generating a first signal based on a first current, which is overall current consumption of the circuit and carries the information;
    means for generating a second signal based on a second current, which is current consumption of one or more dynamic current loads of the circuit;
    means for generating a third signal by combining the first and second signals; and
    means for providing the third signal to a means for demodulating the third signal to recover the information, wherein dependencies on the current consumption of dynamic current loads are at least partly compensated for by the third signal.

14. The circuit of claim 13, wherein the means for generating the first signal and the means for generating the second signal comprise respective measuring devices.

15. The circuit of claim 13, wherein the means for generating the second signal includes a regulating transistor.

16. The circuit of claim 15, wherein the regulating transistor is an NMOS transistor.

17. The circuit of claim 13, further comprising a rectifier means, wherein the first current is received from the rectifier means.

18. The circuit of claim 13, further comprising means for receiving electromagnetic energy.

19. The circuit of claim 17, further comprising a parallel regulator and a constant current load disposed between the rectifier means and the one or more dynamic current loads.

* * * * *